United States Patent [19]

Hiroi

[11] Patent Number: 4,621,927
[45] Date of Patent: Nov. 11, 1986

[54] MIXTURE CONTROL APPARATUS AND MIXTURE CONTROL METHOD

[75] Inventor: Kazuo Hiroi, Tokyo, Japan

[73] Assignee: Kabushiki Kaisha Toshiba, Kawasaki, Japan

[21] Appl. No.: 694,995

[22] Filed: Jan. 25, 1985

[30] Foreign Application Priority Data

Feb. 1, 1984 [JP] Japan .................................. 59-16851

[51] Int. Cl.⁴ ............................................. B01F 15/04
[52] U.S. Cl. .................................... 366/132; 366/151; 366/160; 366/348
[58] Field of Search .................... 366/2, 131, 132, 133, 366/134, 136, 137, 142, 177, 151, 152, 184, 160, 348, 349, 601

[56] References Cited

U.S. PATENT DOCUMENTS 4,433,917 2/1984 Mendel et al. ...................... 366/132
4,436,431 3/1984 Strong et al. ..................... 366/132 X

FOREIGN PATENT DOCUMENTS 1084358 9/1975 Japan .
1463488 2/1977 United Kingdom ................ 366/132

Primary Examiner—Timothy F. Simone
Attorney, Agent, or Firm—Oblon, Fisher, Spivak, McClelland & Maier

[57] ABSTRACT

A mixture control apparatus controls a flow rate of a second fluid to be mixed with a first fluid so as to prepare a third fluid having a predetermined concentration. A set point variable of the flow rate of the second fluid is calculated in accordance with the flow rate of the third fluid so as to improve controllabilty of the apparatus. A gain correction circuit calculates a gain correction quantity using the flow rate of the third fluid. A feed forward circuit calculates a feed forward control component. A feedback circuit calculates a feedback control component. The set point variable of the flow rate of the second fluid is calculated in accordance with the feed forward control component and the feedback control component. The flow rate of the second fluid is controlled to coincide with this set point variable.

20 Claims, 8 Drawing Figures

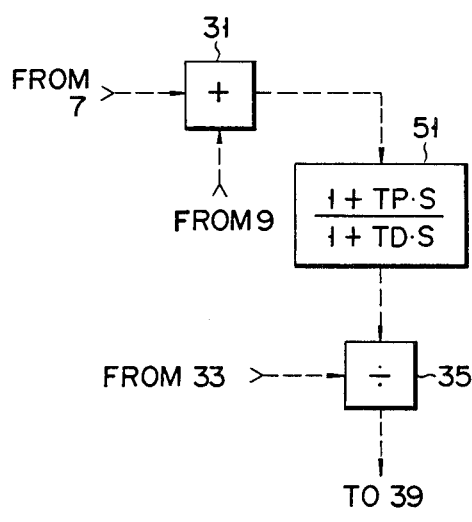
FIG. 3
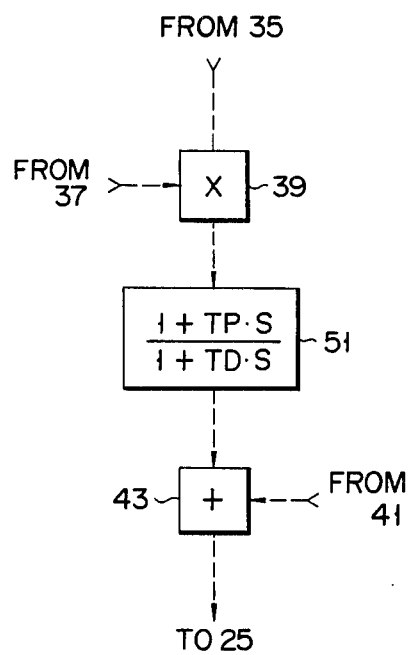
FIG. 4
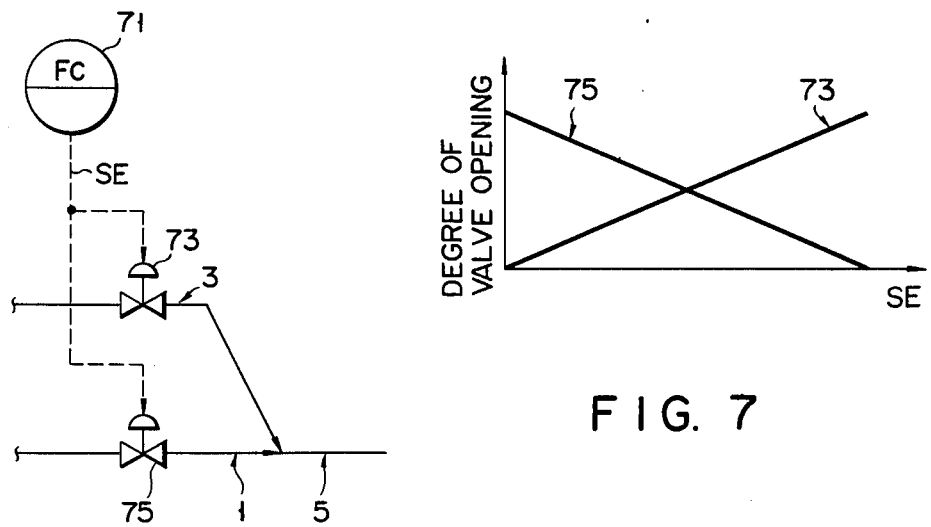
FIG. 6
FIG. 7

MIXTURE CONTROL APPARATUS AND MIXTURE CONTROL METHOD

BACKGROUND OF THE INVENTION

The present invention relates to an improvement in the method and apparatus for mixing fluids having different process variables such as concentration or temperature to obtain a fluid having a desired process variable.

Strong demand has arisen for so-called flexible process automation. Flexible process automation is defined as a process for preparing different items each having desired quality and quantity. In order to control the process, the response and controllability characteristics of the respective control systems must be improved.

Various types of mixture control operations such as supply air temperature control, supply air humidity control, turbidity control, or fuel calorie control are included in process control systems. The transient response and controllability characteristics of these control systems are largely influenced by changes in load such as production quantity, which, of course, detracts from the quality and uniformity of the resultant products. Thus, it is important to produce uniform, high quality products and also to use as little energy as possible.

FIG. 1 is a block diagram of a conventional mixture control apparatus. Referring to FIG. 1, solid lines represent an actual construction, and dotted lines represent signal flows, respectively. This mixture control apparatus mixes two fluids to obtain a desired, third fluid. More particularly, in this mixture control apparatus, a fluid A having a concentration Xa and flowing through a pipe 1 is mixed with a second fluid B having a concentration Xb and flowing through a second pipe 3 to prepare a third fluid C having a desired concentration Xs (but actually with a concentration Xc). The fluid C is supplied to a demand portion (not shown) through a third pipe 5.

The construction and operation of the mixture control apparatus will be described with reference to FIG. 1. In the following description, an output signal from a concentration detector 11 is not the concentration Xa but is a corresponding signal. However, for illustrative convenience, signals corresponding to respective physical quantities and calculated values are designated with the same reference numerals as those of the physical quantities and calculated values throughout the specification and in the accompanying drawings. The same reference symbols of concentration and flow rate of the fluids are also used in mathematical expressions.

The first flow detector 7 and the second flow detector 9 are arranged in the first and second pipes 1 and 3, respectively. The first and second flow detectors 7 and 9 detect flow rates Fa and Fb of the first and second fluids A and B and generate corresponding signals Fa and Fb, respectively. The first, second and third concentration detectors 11, 13 and 15 are arranged in the first, second and third pipes 1, 3 and 5, respectively. The first, second and third concentration detectors 11, 13 and 15 detect concentrations Xa, Xb and Xc of the first, second and third fluids A, B and C and generate corresponding signals Xa, Xb and Xc, respectively. A mixing ratio calculation circuit 17 receives a set point variable Xs of the concentration of the third fluid C and the signals Xa and Xb. The ratio calculation circuit 17 calculates the ratio K as a ratio of the flow rate Fa of the first fluid A to the flow rate Fb of the second fluid B, using the signals Xs, Xa and Xb. The circuit 17 then generates a corresponding signal K. The ratio K is calculated in the following manner. The overall material balance provides equation (1), and the component material balance provides equation (2). The ratio K is thus given by equation (3) below in accordance with equations (1) and (2).

$$Fa \times K = Fb \tag{1}$$

$$Fc \times Xs = (Fa + Fb) \times Xs \tag{2}$$
$$= (Fa \times Xa) + (Fb \times Xb)$$

$$K = (Xs - Xa)/(Xb - Xs) \tag{3}$$

A first multiplier 19 receives the signals K and Fa and multiplies the signal K with the signal Fa. The first multiplier 19 then generates a corresponding signal KFa. The concentration control unit 21 receives the signals Xc and set point variable Xs and calculates the difference (Xs−Xc) between the concentration Xs and the actual concentration Xc of the fluid C. The unit 21 generates a corresponding concentration control signal $\Delta X1$. A second multiplier 23 multiplies the signal KFa with the concentration control signal $\Delta X1$ to obtain a set point variable Fs of the flow rate of the second fluid B. The second multiplier 23 then generates a corresponding signal Fs. The set point variable Fs of the flow rate of the fluid B is thus expressed by equation (4) below. A flow control unit 25 generates a control signal SC so as to set the flow rate Fb to the set point variable Fs in accordance with the signals Fs and Fb. The degree a flow control valve 27 opens is adjusted in response to the signal SC. The mixture control apparatus controls the mixing quantity of the second fluid to prepare the fluid C, having a desired concentration Xs. Signal $\Delta X1$ varies with respect to 1 as shown in equation (5). Substitution of equation (5) into equation (4) yields equation (6).

$$Fs = Fa \times (Xs - Xa) \times \Delta X1/(Xb - Xs) \tag{4}$$

$$\Delta X1 = 1 + \Delta C \tag{5}$$

$$Fs = Fa \times (Xs - Xa) \times (1 + \Delta C)/(Xb - Xs) \tag{6}$$

As is apparent from equation (6), the flow rate set point variable Fs of the second fluid B is calculated such that the ratio K is multiplied with the flow rate Fa of the first fluid A. For this reason, the conventional mixture control apparatus and the method thereof have the following drawbacks.

(1) The flow rate of one of the fluids to be mixed is controlled in accordance with the flow rate of the other thereof. For example, the set point variable of the flow rate of the second fluid B is calculated in accordance with the flow rate Fa of the first fluid A. For this reason, the set point variable Fs cannot accurately determine a transient change in the flow rate Fc (load flow rate) of the third fluid C. When the flow rate Fc in the mixture control apparatus changes, the set point variable Fs of the flow rate cannot be accurately calculated. In particular, for the accurate calculation of Fs, the flow rate Fb should be higher than the flow rate Fa. An accurate set point variable Fs can be calculated. For this reason, transient disturbance occurs in the conventional mixture control apparatus after the flow rate Fc changes. In other words, the conventional mixture control apparatus has low transient controllability.

(2) A gain correction value is obtained in accordance with a flow rate of one of the fluids to be mixed in a conventional mixture control apparatus. For example, a gain correction value GS of the control system in the conventional mixture control apparatus is given as equation (7) in accordance with equation (6). The gain correction value GS changes in accordance with a change in load flow rate Fc. However, in this case, the gain correction value GS is calculated in accordance with the flow rate Fa. The gain correction cannot be accurately performed after the flow rate Fc changes. The gain for controlling the concentration Xc of the third fluid C deviates from the optimal value, thereby degrading controllability. In other words, gain adaption for disturbance cannot be accurately performed.

$$GS = Fa \times (Xs - Xa)/(Xb - Xs) \quad (7)$$

SUMMARY OF THE INVENTION

It is an object of the present invention to provide a mixture control apparatus and a method which have good response and controllability characteristics with respect to changes in load flow rate.

In order to achieve the above object of the present invention, there is provided a mixture control apparatus for mixing first and second fluids having different qualities to obtain a third fluid having a desired quality, comprising:

flow rate detecting means for detecting a flow rate of the third fluid;

gain correction quantity calculating means for detecting the process variables of the first and second fluids and receiving an output signal from the flow rate detecting means and for calculating a gain correction quantity in accordance with the differences between the process variables of the first and second fluids and the flow rate of the third fluid;

set point variable input means for entering a set point variable of the process variable of the third fluid;

feed forward control signal generating means for; detecting the process variable of the first fluid, receiving an output signal from the gain correction quantity calculating means and the set point variable of the process variable of the third fluid from the set point variable input means and generating a feed forward control signal in accordance with the gain correction quantity, the set point variable of the process variable of the third fluid and the process variable of the second fluid;

feedback control signal generating means for; detecting the process variable of the third fluid, receiving the set point variable of the process variable of the third fluid and the output signal from the gain correction quantity calculating means and generating a feedback control signal in accordance with the process variable of the third fluid and the gain correction quantity; and flow controlling means for controlling mixing quantities of the first and second fluids in accordance with the feed forward control signal and the feedback control signal.

In a mixture control apparatus having the arrangement described above, the mixing flow rates of the first and second fluids are calculated in accordance with the flow rate (load flow rate) of the third fluid. For this reason, the mixing quantities of the first and second fluids can be accurately controlled in accordance with changes in load flow rate. In addition, gain correction is performed after calculating the gain correction quantity, so that optimal gain control can be performed even if the flow rate of the third fluid and the qualities of the first and second fluids change. Therefore, the gain is held at the optimal value, and the process control system can be stabilized.

BRIEF DESCRIPTION OF THE DRAWINGS

FIGS. 3 and 4 are block diagrams showing circuits to which lead/lag elements are respectively added to the mixture control apparatus shown in FIG. 2;

FIG. 6 is a block diagram showing the arrangement wherein flow control valves are arranged in the first and third pipes, respectively;

FIG. 7 is a graph for explaining the degrees of opening of the valves shown in FIG. 6.

DETAILED DESCRIPTION OF THE PREFERRED EMBODIMENTS

A method and apparatus for controlling a mixture according to an embodiment of the present invention will be described with reference to the accompanying drawings.

Figure 1:
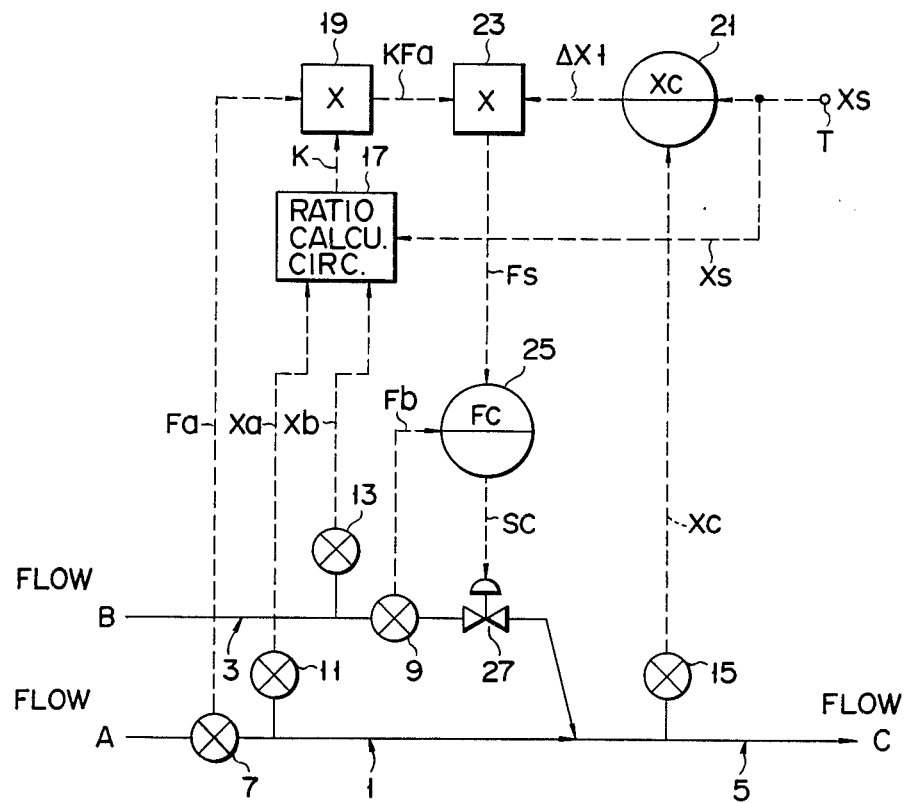
FIG. 1 is a block diagram of a conventional mixture control apparatus.
Figure 2:
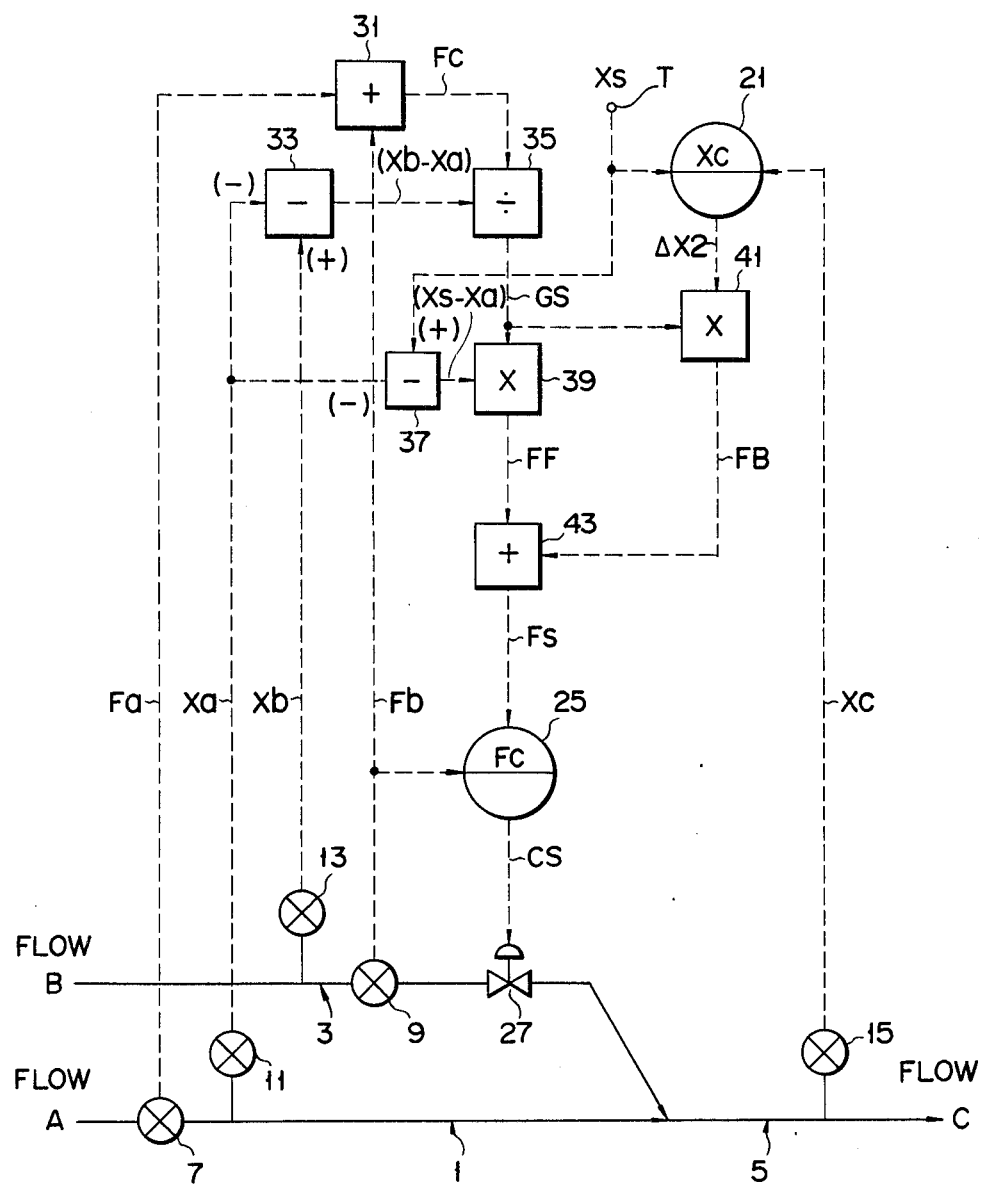
FIG. 2 is a block diagram of a mixture control apparatus according to an embodiment of the present invention.

FIG. 2 shows the arrangement of a mixture control apparatus according to a first embodiment of the present invention. The same reference numerals as in FIG. 1 denote the same parts as in FIG. 2. As previously described, signals are designated with the same reference symbols as those of respective physical quantities and calculated values. The mathematical expressions are represented by reference symbols of the concentrations, and the flow rates, etc. of the fluids.

The mixture control apparatus shown in FIG. 2 mixes a fluid A, flowing through a pipe 1, with a second fluid B, flowing through a second pipe 3, to prepare a third fluid C having a predetermined concentration Xs in the same manner as in the apparatus shown in FIG. 1. The fluid C is then supplied to a demand portion (not shown) through a third pipe 5. The controlled variable of the control apparatus of FIG. 2 is the concentration Xc of the third fluid C. The manipulated variable is the flow rate Fb of the second fluid B.

The arrangement of the mixture control apparatus will be described with reference to FIG. 2. A flow rate detector 7 and a concentration detector 11 are arranged in the first pipe 1. A second flow rate detector 9, a second concentration detector 13 and a manipulator, for example, a flow control valve 27 are arranged in the second pipe 3. There is a third concentration detector 15 arranged in the third pipe 5. Output signals from the first and second flow rate detectors 7 and 9 are supplied to a load flow rate calculating adder 31. The adder 31 adds the input signals. An output signal from the first concentration detector 11 is supplied to the negative input terminal of a concentration difference calculating subtracter 33. An output signal from the second concentration detector 13 is supplied to the positive input terminal of the subtracter 33. The subtracter 33 calculates the difference between these input signals. Output signals from the adder 31 and the subtracter 33 are supplied to a gain correction quantity calculating divider 35. The divider 35 calculates a quotient of the input signals. A terminal T receives from a signal source (not shown) a signal Xs which represents a set point variable Xs of the concentration Xc of the third fluid C. The positive input terminal of a concentration deviation calculating subtracter 37 receives the signal Xs of the concentration of the third fluid C through the terminal T. An output signal from the first concentration detector 11 is supplied to the negative input terminal of the subtracter 37. The subtracter 37 calculates the difference between the input signals thereto. Output signals from the subtracter 37 and the divider 35 are supplied to a feed forward component calculating multiplier (to be referred to as an FF multiplier hereinafter) 39. The FF multiplier 39 multiplies the input signals supplied thereto. The output signal from the third concentration detector 15 and the signal Xs (representing the set point variable Xs of the concentration Xc) of the third fluid C are supplied to a concentration control unit 21. The concentration control unit 21 generates a concentration control signal $\Delta X2$. An output signal from the divider 35 and the output signal $\Delta X2$ from the concentration control unit 21 are supplied to a gain correction multiplier 41. The multiplier 41 multiplies the input signals supplied thereto. Output signals from the multipliers 39 and 41 are supplied to a flow rate set point variable calculating adder 43. The adder 43 adds the two input signals supplied thereto. An output signal from the adder 43 and the output signal from the second flow rate detector 9 are supplied to the flow control unit 25. The unit 25 controls the opening of the flow control valve (e.g., an electromagnetic valve) 27 in accordance with the input signals supplied thereto.

The operation of the mixture control apparatus having the construction shown in FIG. 2 will be described hereinafter.

The first and second flow rate detectors 7 and 9 detect flow rates Fa and Fb of the first and second fluids A and B and generate corresponding signals Fa and Fb, respectively. The adder 31 receives and adds the signals Fa and Fb and generates a corresponding signal Fc. The signal Fc corresponds to a flow rate Fc(=Fa+Fb) of the third fluid C. The first and second concentration detectors 11 and 13 detect the concentrations Xa and Xb of the first and second fluids A and B and generate corresponding signals Xa and Xb, respectively. The subtracter 33 receives the signals Xa and Xb and subtracts the signal Xa from the signal Xb. The subtracter 33 generates a corresponding signal (Xb−Xa). The signal (Xb−Xa) corresponds to a difference (Xb−Xa) between the concentration Xb of the second fluid B and the concentration Xa of the first fluid A. The divider 35 receives the signal Fc from the adder 31 and the signal (Xb−Xa) from the subtracter 33. The divider 35 divides the signal Fc by the signal (Xb−Xa) and generates a corresponding signal GS. The signal GS corresponds to a gain correction quantity {Fc/(Xb−Xa)} of the control system of the apparatus. The subtracter 37 receives the set point variable Xs of the concentration of the third fluid C and the signal Xa from the first concentration detector 11. The subtracter 37 subtracts the signal Xa from the signal Xs and generates a corresponding signal (Xs−Xa). The signal (Xs−Xa) corresponds to a difference between the set point variable Xs of the concentration of the third fluid C and the concentration Xa of the first fluid A. The FF multiplier 39 receives the signal GS from the divider 35 and the signal (Xs−Xa) from the subtracter 37. The FF multiplier 39 multiplies the signal GS with the signal (Xs−Xa) and generates a corresponding signal FF. The signal FF corresponds to the feed forward component {FC×(Xs−Xa)/(Xb−Xa)} of the control system of the control apparatus. The output signal Xc from the third concentration detector 15 and the signal Xs are supplied to the concentration control unit 21. The concentration control unit 21 generates a concentration control signal $\Delta X2$ in accordance with the input signals supplied thereto. The concentration control signal $\Delta X2$ varies with respect to value O. When the set point variable Xs is larger than the concentration Xc, the concentration control signal $\Delta X2$ is gradually increased. However, when the set point variable Xs is smaller than the concentration Xc, the concentration control signal $\Delta X2$ is gradually decreased. The multiplier 41 receives the signal GS from the divider 35 and the concentration control signal $\Delta X2$ from the control unit 21. The multiplier 41 multiplies the input signal Xs with the concentration control signal $\Delta X2$ and generates a corresponding signal FB. The signal FB corresponds to a feedback component {FC×$\Delta X2$/(Xb−Xa)} of the control system of the apparatus. The adder 43 receives the signal FF and the signal FB. The adder 43 adds the signals FF and FB and generates a corresponding signal Fs. The signal Fs corresponds to a set point variable Fs(=Fc×(Xs−Xa+$\Delta X2$)/(Xb−Xa)) of the flow rate Fb of the second fluid B. The flow control unit 25 receives the signal Fs and the output signal Fb from the second flow rate detector 9. The flow control unit 25 generates a signal CS in accordance with the input signals Fs and Fb supplied thereto. The degree of opening of the flow control valve 27 is controlled in response to the signal CS. The flow rate of the second fluid B is controlled in such a manner that the flow rate FB coincides with the set point variable Fs. Therefore, the concentration Xc of the third fluid C coincides with the set point variable Xs.

In the mixture control apparatus having the above arrangement and operated in the manner as described above, the concentration Xc is equal to the set point variable Xs and the flow rate Fb is equal to the set point variable Fs in the normal state. In this case, equations (8) and (9) below are derived from the overall material balance and the component material balance, respectively:

$$Fb = (Fa + Fb) \times \alpha = Fc \times \alpha \tag{8}$$

$$(Fa \times Xa) + (Fb \times Xb) = (Fa + Fb) \times Xs \tag{9}$$

where $\alpha$ is the ratio of the flow rate Fb to the flow rate Fc. Equation (10) is therefore derived from equations (9) and (10) as follows:

$$Fs = Fc \times \alpha = Fc \times (Xs - Xa)/(Xb - Xa) \tag{10}$$

In the normal state, the above value Fs of equation (10) corresponds to the output signal Fs from the adder 43.

When the process control system is not set in the normal state, the control apparatus modifies the set point variable Xs using the concentration control signal $\Delta X2$ and calculates the set point variable Fs. In this case, the flow rate set point variable Fs of the second fluid B is given by equation (11) in accordance with equation (10):

$$F_s = F_c \times (X_s - X_a + \Delta X_2)/(X_b - X_a) \quad (11)$$

Equation (11) can be rewritten as equation (12) as follows:

$$F_s = F_c \times (X_s - X_a)/(X_b - X_a) + F_c \times \Delta X_2/(X_b - X_a) \quad (12)$$

This value coincides with the set point variable Fs when the concentration control signal $\Delta X_2$ is generated. In equation (12), the first term indicates the feed forward (FF) component of the control system of the control apparatus and corresponds to the output signal FF from the multiplier 39. In equation (12), the second term indicates the feedback component of the control system of the control apparatus and corresponds to the output signal FB from the multiplier 41. Term $F_c/(X_b - X_a)$ indicates the gain correction quantity and corresponds to the output signal Gs from the divider 35; and $\Delta X_2$ indicates the concentration control output. Therefore, the FF control output is obtained by multiplying the ratio $(X_s - X_a)/(X_b - X_a)$ with the flow rate Fc of the third fluid C after fluid mixing. In this case, the concentration control output signal $\Delta X_2$ is gain-corrected by the product of the flow rate Fc of the third fluid C and $1/(X_b - X_a)$.

According to the method and apparatus of this embodiment, the set point variable Fs of the flow rate Fb of the second fluid B is calculated in accordance with equation (12). The fluid B having the flow rate equal to the set point variable Fs is mixed with the first fluid A to prepare the third fluid C. For this reason, the method and apparatus of this embodiment have the following advantages over the conventional method and apparatus for calculating the set point variable of the flow rate of the second fluid in accordance with equation (5):

(1) In the conventional method and apparatus, the set point variable Fs of the flow rate of the second fluid B is calculated in accordance with one of the fluids to be mixed. However, in the apparatus of this embodiment, the set point variable Fs of the flow rate of the fluid B to be controlled is calculated in accordance with the flow rate of the resultant fluid C. For this reason, the set point variable Fs of the flow rate of the second fluid B can be accurately and rapidly calculated in accordance with changes in the load flow rate Fc. The response characteristic of the mixture control apparatus which follows changes in load flow rate of the control system can be greatly improved.

(2) The gain correction of the conventional method and apparatus is not theoretically accurate. However, according to the method and apparatus of the above embodiment, gain correction is performed by using the flow rate Fc of the resultant fluid C in the gain correction quantity $\{F_c/(X_b - X_a)\}$. For this reason, the gain correction of concentration control can be accurately performed. In addition, the gain can be automatically corrected even if the flow rate Fc, the concentration Xa of the first fluid A or the concentration Xb of the second fluid B changes. As a result, the gain can be kept at the optimal value, and stable control can be provided.

Effects (1) and (2) described above improve control stability and response characteristics. Under these conditions, a product with a stable process variable can be obtained. The deviation between the flow rate Fb of the second fluid B and the set point variable Fs decreases, so that the valve 27 doesn't have to be activated so often. In other words, the mixture control apparatus of this embodiment contributes to energy saving. In addition, since the concentration Xc of the third fluid C can approach the limit within the controllable range of the apparatus, productivity can be increased, and hence a flexible method and apparatus can be provided.

A second embodiment of the present invention will be described with reference to FIGS. 3 and 4. In the first embodiment, the feed forward control is static. For this reason, as soon as the flow rate Fc changes, the flow rate Fb is changed and the control of concentration Fc is delayed. In this case, it takes a long period of time until the flow rate Fb of the second fluid B is set at the optimal value after the load flow rate Fc changes, thereby degrading controllability of the apparatus. In order to eliminate this problem, a lead/lag element can be added in the arrangement in FIG. 2. Equation (12) can be rewritten as equation (13) as follows:

$$F_s = F_c \times \{(1 + TP \cdot S)/(1 + TD \cdot S)\} \times \{(X_s - X_a + \Delta X_2)/(X_b - X_a)\} \quad (13)$$

where TD is the time for which a change (disturbance) in the flow rate Fc of the third fluid C occurs and the concentration Xc of the fluid C is then changed, TP is the time for which a change in the flow rate Fb of the second fluid B occurs and the concentration Xc of the fluid C is changed, and S is the complex variable.

As shown in FIG. 3, a lead/lag element 51 is added to the arrangement of FIG. 2 to obtain a flow rate set point variable Fs of a dynamic model. Referring to FIG. 3, the lead/lag element 51 is inserted between the adder 31 and the divider 35. A transfer function Y of the element 51 is given as equation (14) in accordance with equation (13). When the time TD is longer than the time TP, the lead/lag element 51 serves as a lag element, so that the set point variable Fs given by equation (13) is generated from the adder 43. However, when the time TP is longer than the time TD, the element 51 serves as a lead element. In this case, the same output signal as given in equation (13) is theoretically generated from the adder 43. However, in practice, when dynamic compensation of the concentration control output $\Delta X_2$ is performed, the response speed is increased resulting in overshooting. This overshooting causes a hatching phenomenon and results in inconvenience. For this reason, when lead compensation is performed, a lead/lag element 51 is arranged, as shown in FIG. 4, i.e., between the multiplier 39 and the adder 43. In this manner, when lead compensation is performed, dynamic compensation is applied only to FF control. It is thus preferable not to perform dynamic compensation for concentration control. In this case, set point variable Fs is given by equations (15), (16).

$$Y = (1 + TP \cdot S)/(1 + TD \cdot S) \quad (14)$$

$$F_s = F_c \times [\{(1 + TP \cdot S)/(1 + TD \cdot S)\} \times \{(X_s - X_a)/(X_b - X_a)\} + \Delta X_2/(X_b - X_a)] \quad (15)$$

$$F_s = F_c \times [\{(X_s - X_a)/(X_b - X_a)\} \times \{(1 + TP \cdot S)/(1 + TD \cdot S)\} + \Delta X_2/(X_b - X_a)] \quad (16)$$

The set point variable Fs of the flow rate of the second fluid B is calculated in accordance with equation (15), (16). When the lead/lag element 51 serves as the lag element, the circuit shown in FIG. 4 may be adapted.

By arranging the lead/lag elements 51 shown in FIGS. 3 and 4, control of the concentration Xc can be accurately performed at high speed even when the load flow rate Fc changes.

Figure 5:
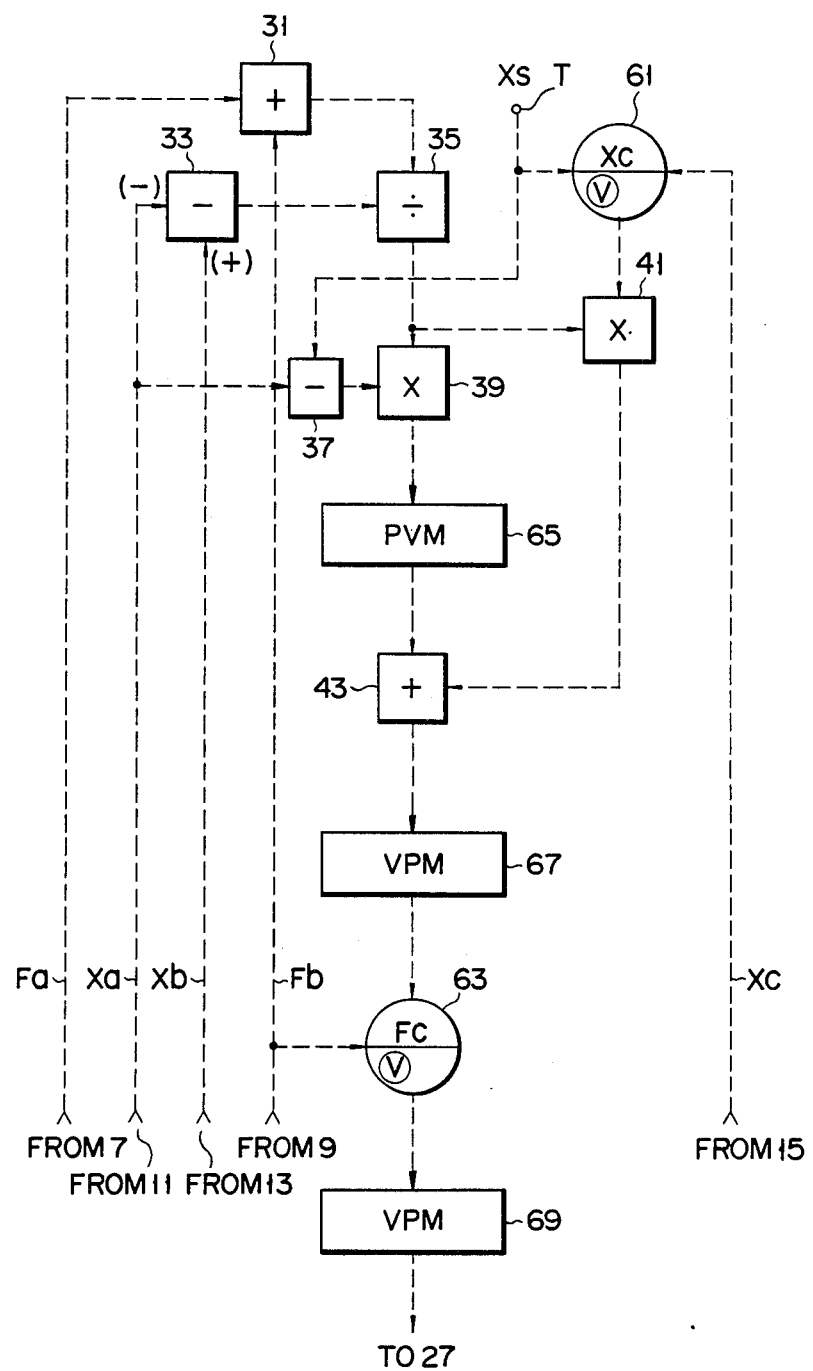
FIG. 5 is a block diagram of a velocity type mixture control apparatus according to the present invention.

In the first and second embodiments, various operations are performed using a so-called positional signal. However, the present invention is not limited to this arrangement, and can be extended to an arrangement wherein the various operations can be performed using a velocity signal. In this case, as shown in FIG. 5, a velocity type concentration control unit 61 and a velocity type flow control unit 63 must be used. A modulator (PVM) 65 is arranged between the multiplier 39 and the adder 43 to convert a positional signal to a velocity signal. A modulator (VPM) 67 is arranged between the adder 43 and the flow control unit 63 to convert the velocity signal to the positional signal. A modulator (VPM) 69 is arranged between the flow control unit 63 and the flow control valve 27 to convert the velocity signal to the positional signal.

In the previous embodiments, the flow control valve 27 is arranged only in the second pipe 3. However, the present invention is not limited to this arrangement. As shown in FIG. 6, a ratio control unit 71 can be arranged in place of the flow control unit 25. In this case, flow control valves 75 and 73 are arranged in the first and second pipes 1 and 3, respectively. These valves are controlled in response to a signal SE. As shown in FIG. 7, when one of the valves is opened, the other is closed. In this manner, the valves are subjected to alternate operation. It is preferable to maintain the sum of impedances of the first and second pipes constant with respect to the third pipe C.

Figure 8:
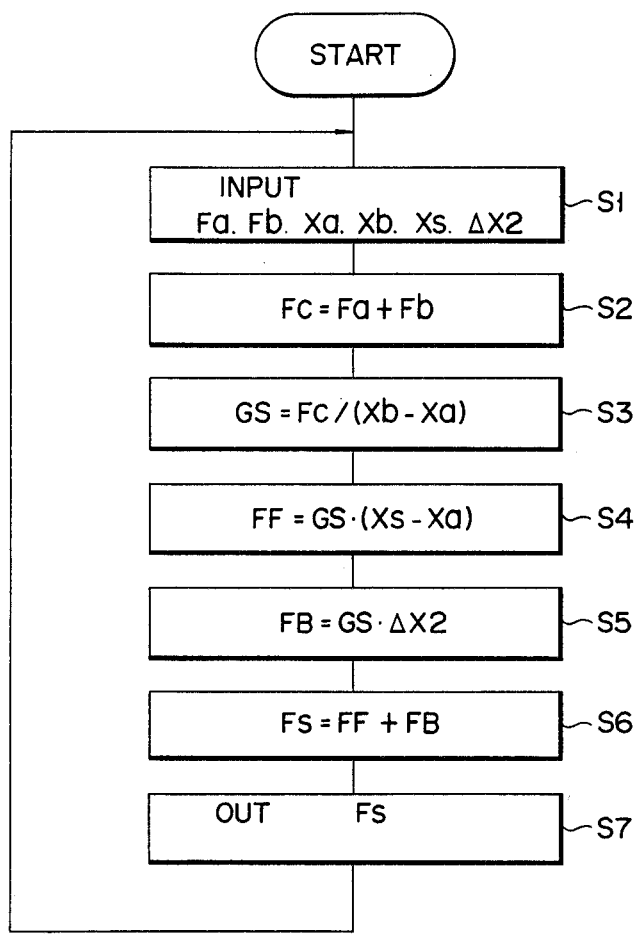
FIG. 8 is a flow chart for explaining the operation of the mixture control apparatus (FIG. 2) according to another embodiment of the present invention.

In the previous embodiments, signals are processed by adders, subtractors, multipliers and dividers. However, the present invention is not limited to this. For example, signal processing can be performed under the control of a microcomputer. In this case, arithmetic elements correspond to the operation steps as shown in the flow chart of FIG. 8. The microcomputer receives data Xa, Xb, Xc, Fa, Fb, ΔX2 and so on in step S1. The microcomputer calculates the flow rate Fc of the third fluid C in accordance with the input signals in step S2. In step S3, the gain correction quantity GS is calculated. In step S4, the feed forward control component FF is calculated. In step S5, the feedback control component FB is calculated. The set point variable Fs of the flow rate of the fluid B is calculated and generated in steps S6 and S7. The signal Fs is converted to an analog signal which is then supplied to the flow control unit 25.

In the above embodiments, only two fluids are mixed. However, the mixture control apparatus of the present invention can mix three or more fluids.

In the first and second embodiments, the concentration detectors 11 and 13 are arranged to detect the concentrations of the first and second fluids A and B, respectively. However, when these fluids have almost the same concentration, the concentration detectors 11 and 13 may be omitted. In this case, a signal source replaces the detectors 11 and 13 to generate a signal having a predetermined level.

When the set point variable Xs of the concentration of the third fluid C is sufficiently larger than the concentration Xa of the first fluid A, terms Xa in the denominator and numerator of equation (11) can be omitted. In this case, the first concentration detector 11 and the subtractor 37 are omitted, and the set point variable Xs of the concentration of the third fluid C is directly coupled to the multiplier 39. Similarly, when the concentration Xb of the second fluid B is sufficiently larger than the concentration Xa of the first fluid A, Xa in equation (11) can be omitted. In this case, the first concentration detector 11 and the subtracter 33 can be omitted, and the output signal Xb from the second concentration detector 13 is directly coupled to the divider 35.

In the above embodiments, the flow rates Fa and Fb of the first and second fluids A and B are measured. However, since relation Fc=Fa+Fb is known, at least two of the values Fa, Fb and Fc need only be measured.

In the above embodiments, the concentration is exemplified as a process variable to be controlled. Two fluids having different concentrations are mixed to prepare a fluid having a desired concentration. However, the process variable to be controlled is not limited to concentration but can be extended to temperature, humidity, turbidity or calorific value. Two fluids having different temperatures are mixed to prepare a fluid having a predetermined temperature. In this case, temperature detectors are used in place of the concentration detectors 11, 13 and 15. The concentration set point variable Xs is replaced with a temperature set point variable of the third fluid C.

In the above embodiments, the concentration control unit 21, the flow control unit 25 and the lead/lag element 51 can be conventional ones.

What is claimed is:

1. A mixture control apparatus for mixing two fluids having different process variables to obtain a third fluid having a desired process variable, comprising:

flow rate detecting means for detecting the flow rate of the third fluid;

gain correction quantity calculating means for detecting process variables of the first and second fluids, receiving an output signal from said flow rate detecting means, and for calculating a gain correction quantity in accordance with the difference between the process variables of the first and second fluids and with the flow rate of the third fluid;

set point variable input means for receiving a set point variable which is externally supplied for the process variable of the third fluid;

feed forward control signal generating means for receiving an output signal from said gain correction quantity calculating means and the set point variable of the process variable of the third fluid which is generated from said set point variable input means, detecting the process variable of the first fluid, and for generating a feed forward control signal in accordance with the gain correction quantity, the set point variable of the process variable of the third fluid and the process variable of the first fluid;

feedback control signal generating means for detecting the process variable of the third fluid, receiving the set point variable of the process varible of the third fluid and the output signal from said gain correction quantity calculating means, and generating a feedback control signal in accordance ith the process variable of the third fluid, the set point variable of the process variable of the third fluid and the output signal from said gain correction quantity calculating means; and flow controlling means for controlling mixing quantities of the first and second fluids in accordance with the feed forward control signal and the feedback control signal.

2. An apparatus according to claim 1, wherein said flow rate detecting means comprises:
   means for detecting a flow rate of the first fluid;
   means for detecting a flow rate of the second fluid; and
   adding means for receiving output signals from said first and second fluid flow rate detecting means and calculating a sum of the flow rates of the first and second fluids.

3. An apparatus according to claim 1, wherein said gain correction quantity calculating means comprises:
   means for detecting the process variable of the first fluid;
   means for detecting the process variable of the second fluid;
   difference calculating means for receiving output signals from said first and second process variable detecting means and calculating a difference between the process variable of the first and second fluids; and
   dividing means for receiving an output signal from said flow rate detecting means and an output signal from said difference calculating means and for dividing the flow rate of the third fluid by the difference between the process variables of the first and second fluids, thereby obtaining a gain correction quantity.

4. An apparatus according to claim 1, wherein said feed forward control signal generating means comprises:
   means for detecting the process variable of the first fluid;
   difference calculating means for receiving an output signal from said first fluid process variable detecting means and the set point variable of the process variable of the third fluid from said set point variable input means, and for calculating the difference between the set point variable of the process variable of the third fluid and the process variable of the first fluid; and
   feed forward multiplying means for receiving an output signal from said gain correction quantity calculating means and an output signal from said difference calculating means and calculating a product of the gain correction quantity and the difference between the set point variable of the process variable of the third fluid and the process variable of the first fluid, thereby generating the feed forward control signal corresponding to this product.

5. An apparatus according to claim 1, wherein said feedback control signal generating means comprises:
   means for detecting the process variable of the third fluid;
   process variable control signal generating means for receiving the output signal from said third fluid process variable detecting means and the set point variable of the process variable of the third fluid from said set point variable input means, and for generating a process variable control signal corresponding to a difference between the process variable of the third fluid and the set point variable; and
   feedback multiplying means for receiving the process variable control signal from said process variable control signal generating means and the output signal from said gain correction quantity calculating means and for calculating a product of the process variable control signal and the gain correction quantity, thereby generating a feedback control signal corresponding to this product.

6. An apparatus according to claim 1, wherein said flow rate control means comprises:
   control signal adding means for receiving the feed forward control signal from said feed forward control signal generating means and the feedback control signal from said feedback control signal generating means, and for adding the feed forward control signal and the feedback control signal; and
   flow rate control means for controlling the flow rate at least one of said first and second fluids in accordance with an output signal from said control signal adding means.

7. An apparatus according to claim 6, wherein said flow rate control means further comprise means for detecting the flow rate of the second fluid, and for controlling the flow rate of the second fluid in accordance with the output signal from said control signal adding means and an output signal from said means for detecting the flow rate of the second fluid.

8. An apparatus according to claim 1, wherein said process variables comprise fluid concentrations.

9. An apparatus according to claim 1, wherein said process variables comprise temperatures.

10. An apparatus according to claim 1, further comprising dynamic compensation means for performing dynamic compensation for at least one of the feed forward control signals from said feed forward control signal generating means and the feedback control signal from said feedback control signal generating means.

11. An apparatus according to claim 10, wherein a first time interval in which the flow rate of the third fluid changes and the process variable of the third fluid changes is longer than a second time interval in which mixing quantities of the first and second fluids are controlled and the process variable of the third fluid changes, and said dynamic compensation means includes means to perform lag compensation for the feed forward control signal and the feedback control signal.

12. An apparatus according to claim 10, wherein a first time interval in which the flow rate of the third fluid changes and the process variable of the third fluid changes is shorter than a second time interval in which mixing quantities of the first and second fluids are controlled and the process variable of the third fluid changes, and said dynamic compensation means includes means to perform lead compensation for only the feed forward control signal.

13. An apparatus according to claim 10, wherein said dynamic compensation means is a lead/lag element.

14. A method of controlling a mixture in such a manner that two fluids having different process variables are mixed to prepare a third fluid having a desired process variable, comprising:
   a flow rate detecting step of detecting the flow rate of the third fluid;
   a gain correction quantity calculating step of detecting process variables of the first and second fluids and calculating a gain correction quantity in accordance with a difference between the process variables of the first and second fluids and with the flow rate of the third fluid which is obtained in the flow rate detecting step;

a feed forward control component calculating step of detecting a process variable of the first fluid and calculating a feed forward control component in accordance with this process variable of the first fluid, the gain correction quantity obtained in the gain correction quantity calculating step and an externally supplied set point variable of the process variable of the third fluid;

a feedback control component calcuating step of detecting the process variable of the third fluid and calculating a feedback control component in accordance with this process variable of the third fluid, the set point variable of the process variable of the third fluid and the gain correction quantity obtained in the gain correction quantity calculating step; and a flow rate control step of controlling mixing quantities of the first and second fluids in accordance with the feed forward control component obtained in the feed forward control component calculating step and the feedback control component obtained in the feedback control component calculating step.

15. A method according to claim 14, wherein the flow rate detecting step comprises:
   a step of detecting a flow rate of the first fluid;
   a step of detecting a flow rate of the second fluid; and
   a step of adding the flow rate of the first fluid which is obtained in the step of detecting the flow rate of the first fluid and the flow rate of the second fluid which is obtained in the step of detecting the flow rate of the second fluid.

16. A method according to claim 14, wherein the gain correction quantity calculating step comprises:
   a step of detecting the process variable of the first fluid;
   a step of detecting the process variable of the second fluid;
   a step of calculating the difference between the process variable of the second fluid obtained in the step of detecting the process variable of the second fluid, and the process variable of the first fluid obtained in the step of detecting the process variable of the first fluid; and
   a step of calculating the gain correction quantity in such a manner that the flow rate of the third fluid, which is obtained in the flow rate detecting step, is divided by the difference between the process variables of the first and second fluids, the difference having been obtained in the step of calculating the difference between the process variables.

17. A method according to claim 14, wherein the feed forward control component calculating step comprises:
   a step of detecting the process variable of the first fluid;
   a step of calculating a difference between the set point variable of the process variable of the third fluid and the process variable of the first fluid; and
   a step of calculating a product of the gain correction quantity obtained in the gain correction quantity calculating step and the difference between the set point variable and the process variable of the first fluid, to obtain the feed forward control component.

18. A method according to claim 14, wherein the feedback control component calculating step comprises:
   a step of detecting the process variable of the third fluid;
   a step of generating a process variable control signal corresponding to a difference between the process variable of the third fluid and the set point variable of the process variable of the third fluid; and
   a step of calculating a product of the process variable control signal generated in the process variable control signal generating step and the gain correction quantity obtained in the gain correction quality calculating step.

19. A method according to claim 14, wherein the flow rate control step comprises:
   a step of adding the feed forward control component obtained in the feed forward control component calculating step and the feedback control component obtained in the feedback control component calculating step; and
   a step of controlling the flow rate of the first fluid and/or the flow rate of the second fluid in accordance with a vâlve calculated in the step of adding the feed forward control component and the feedback control component.

20. A method according to claim 14, further comprising a dynamic compensation step of performing dyanmic compensation for at least one of the feed forward control component obtained in the feed forward control component calculating step and the feedback control component obtained in the feedback control component calculating step.

* * * * *